(12) United States Patent
Tanaka et al.

(10) Patent No.: US 10,144,130 B2
(45) Date of Patent: Dec. 4, 2018

(54) AUTONOMOUS MOBILE SYSTEM (71) Applicant: HONDA MOTOR CO., LTD., Tokyo (JP)

(72) Inventors: Chiaki Tanaka, Saitama (JP); Takahiro Kuroki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/892,544

(22) Filed: Feb. 9, 2018

(65) Prior Publication Data

US 2018/0281192 A1 Oct. 4, 2018

(30) Foreign Application Priority Data

Mar. 30, 2017 (JP) .................. 2017-068761

(51) Int. Cl.
*B25J 9/16* (2006.01)
*G05D 1/02* (2006.01)
*B25J 13/08* (2006.01)

(52) U.S. Cl.
CPC ............. *B25J 9/1666* (2013.01); *B25J 9/162* (2013.01); *B25J 9/1697* (2013.01); *B25J 13/089* (2013.01); *G05D 1/024* (2013.01); *G05D 1/0214* (2013.01); *Y10S 901/01* (2013.01); *Y10S 901/47* (2013.01)

(58) Field of Classification Search
CPC ........ B25J 9/1666; B25J 9/162; B25J 9/1697; B25J 13/089; G05D 1/0214; G05D 1/024; Y10S 901/01; Y10S 901/47

USPC ......................................................... 701/300
See application file for complete search history.

(56) References Cited

U.S. PATENT DOCUMENTS

2007/0219720 A1\* 9/2007 Trepagnier ............ B60W 30/00
701/300

FOREIGN PATENT DOCUMENTS

JP 2012-247400 12/2012

\* cited by examiner

*Primary Examiner* — Aaron L Troost
*Assistant Examiner* — Paula L Schneider
(74) *Attorney, Agent, or Firm* — Rankin, Hill & Clark LLP (57) ABSTRACT

Robot 1 includes an upper base body 10, and a control section 13 provided inside the upper base body 10. The control section 13 causes measurement section 205c to rotate in a left-right direction around yaw axis, by driving each drive section 205b of two LRFs 205. When passage width necessary for the robot 1 to pass through is W, the control section 13 causes each measurement section 205c to rotate in a range (W/2), by driving each drive section 205b of the two LRFs 205. LRF scanning speed/range calculation section 71 calculates rotation angle θswing and a rotation speed Vswing of the measurement section 205c. The control section 13 drives the drive sections 205b so as to cause the measurement section 205c to rotate at the rotation angle θswing and the rotation speed Vswing calculated by the LRF scanning speed/range calculation section 71.

3 Claims, 11 Drawing Sheets

AUTONOMOUS MOBILE SYSTEM

BACKGROUND OF THE INVENTION

Field of the Invention

The present invention relates to an autonomous mobile system that moves a mobile body.

Description of the Related Art

Conventionally, there has been known a mobile body such as a robot, which comprise a base body and a plurality of manipulators connected to the base body, and which moves by controlling the driving of the plurality of manipulators. In such a mobile body, it is necessary to travel so as not to come into contact with an object that is on a travel path.

An autonomous mobile system described in Japanese Patent Laid-Open No. 2012-247400 comprises a mobile body capable of being moved, a distance sensor mounted on the mobile body, a sensor oscillation device that oscillates the distance sensor, a travel path setting section that sets a travel path of the mobile body, a drive control section that controls the driving of the mobile body, and an oscillation control section that controls the oscillation of the sensor oscillation device. An oscillation control unit limits the oscillation range in a detection region of a distance detection unit by controlling an oscillation unit, in accordance with the position of an object detected by the distance sensor.

However, in the autonomous mobile system described in Japanese Patent Laid-Open No. 2012-247400, while the mobile body is prevented from coming into contact with the object, by limiting the oscillation range of the distance detection unit and setting a travel path, depending on the position of the object detected by the distance sensor, in the case where the travel speed of the mobile body is increased, the mobile body may come into contact with the object, even if the oscillation range of the distance detection unit is limited and the travel path is reset.

The present invention has been made in consideration of such a situation, and provides an autonomous mobile system that is capable of avoiding contact with an object.

SUMMARY OF THE INVENTION

The autonomous mobile system of the present invention comprises a mobile body configured to move at a set travel speed, a distance detection section provided in the mobile body and configured to detect a distance to an object, a scanning unit provided in the mobile body and configured to perform scanning by causing the distance detection section to rotate around an axis in a vertical direction as a center of rotation, and a scanning control unit configured to control driving of the scanning unit based on the set travel speed of the mobile body.

According to the autonomous mobile system of the present invention, the mobile body is able to avoid contacting with the object, even in the case where the travel speed of the mobile body is increased, by controlling the driving of the scanning unit based on the travel speed.

Moreover, it is preferable for the scanning control unit to control at least one of a scanning range and a scanning speed of the distance detection section by controlling driving of the scanning unit based on the set travel speed.

According to this configuration, since the scanning range and the scanning speed of the distance detection section are controlled based on the travel speed, the mobile body is able to avoid contacting with the object.

In addition, it is preferable, in the case where the set travel speed is increased, for the scanning control unit to control driving of the scanning unit so as to perform at least one of a control to reduce a scanning range of the distance detection section and a control to increase a scanning speed of the distance detection section.

According to this configuration, since the scanning range of the distance detection section is reduced and/or the scanning speed of the distance detection section is increased in the case where the set travel speed is increased, the mobile body is able to avoid contacting with the object.

Moreover, it is preferable for the scanning control unit to determine a center of a scanning range of the distance detection section based on a scheduled travel path of the mobile body.

According to this configuration, the mobile body is able to avoid contacting with the object that is on the scheduled travel path, even in the case where the scheduled travel path is curved.

DETAILED DESCRIPTION OF THE PREFERRED EMBODIMENTS

Hereinafter, an embodiment of a robot that comprises an autonomous mobile system relating to the present invention will be described with reference to the figures. The robot of the present embodiment is a humanoid robot, and is constituted to be movable by switching between a bipedal walking mode and a quadrupedal walking mode.

Figure 1:
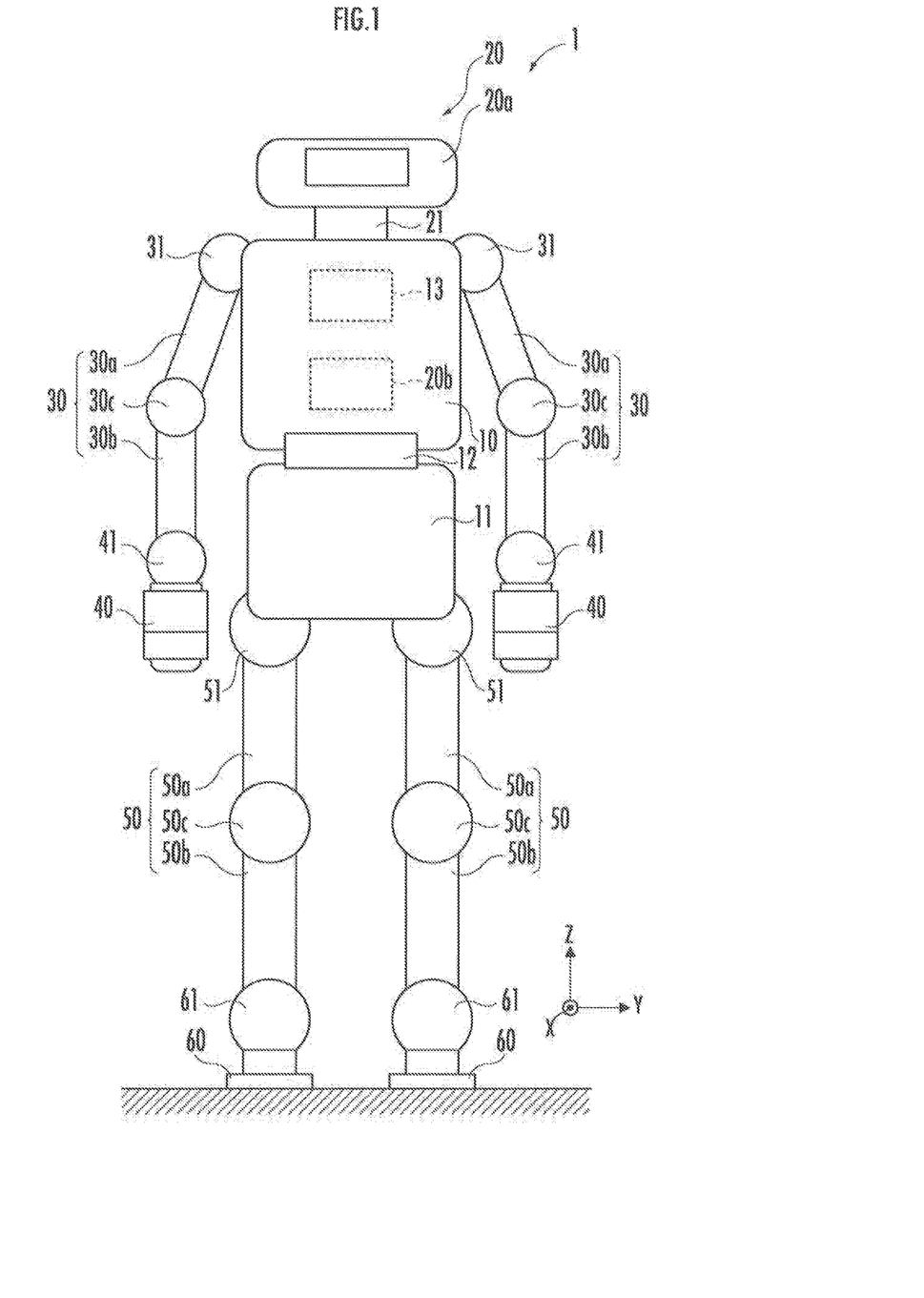
FIG. 1 is a front view that schematically shows a configuration of a robot relating to an embodiment of the present invention.

First, a configuration of a robot 1 will be described with reference to FIG. 1.

The trunk of the robot 1 (mobile body) is constituted by an upper base body 10, a lower base body 11 arranged below the upper base body 10, and a waist joint mechanism 12 provided between the upper base body 10 and the lower base body 11. The upper base body 10 and the lower base body 11 are relatively rotatably connected with respect to each other, via the waist joint mechanism 12 corresponding to a person's waist joint. A control section 13 for totally controlling the robot 1 is provided inside the upper base body 10.

The head of the robot 1 is an environment recognition unit 20a of an environment recognition device 20 for recognizing the surrounding (mainly, the front) environment. Cameras for capturing the outside environment and sensors for recognizing a distance to the outside environment mounted on the environment recognition unit 20a are controlled by an environment recognition unit control circuit 20b arranged inside the upper base body 10. The environment recognition unit control circuit 20b is controlled by the control section 13.

The environment recognition unit 20a is rotatably connected with respect to the upper base body 10, via a neck joint mechanism 21 corresponding to a person's neck joint. Note that, the environment recognition unit 20a may be fixed in a non-rotatable manner to the upper base body 10.

Since the robot 1 is a humanoid robot, the environment recognition unit 20a corresponding to a person's head is provided above the upper base body 10. However, the base body side recognition device of the robot of the present invention is not limited to such a configuration, and may be provided at a position other than above the upper base body (for example, in front of the upper base body, on the lower base body or the like), in accordance with the usage environment of the robot or the like.

The left and right arms of the robot 1 are a pair of arm links 30 extendingly provided from both the left and right sides on the upper part of the upper base body 10. Each of the arm links 30 is rotatably connected with respect to the upper base body 10, via a shoulder joint mechanism 31 corresponding to a person's shoulder joint.

The arm link 30 is constituted by a first arm link section 30a corresponding to a person's upper arm, a second arm link section 30b corresponding to a person's forearm, and an elbow joint mechanism 30c corresponding to a person's elbow joint.

The first arm link section 30a is rotatably connected with respect to the upper base body 10, via the shoulder joint mechanism 31. The second arm link section 30b is rotatably connected with respect to the first arm link section 30a, via the elbow joint mechanism 30c. A hand section 40 corresponding to a person's hand is connected to the end of the second arm link section 30b.

Note that, in the robot 1, the arm link 30, which is an arm, is constituted by the first arm link section 30a, the second arm link section 30b, and the elbow joint mechanism 30c. However, the arm of the robot of the present invention is not limited to such a configuration, and may have a single link section, or may have three or more link sections and a plurality of joint mechanisms for connecting each of the links.

The hand section 40 is an example of an end effector. This hand section 40 is rotatably connected with respect to the second arm link section 30b of the arm link 30, via a wrist joint mechanism 41 corresponding to a person's wrist joint. In the robot 1, a robot arm is constituted, as a manipulator, by the hand section 40 and the arm link 30.

Figure 5:
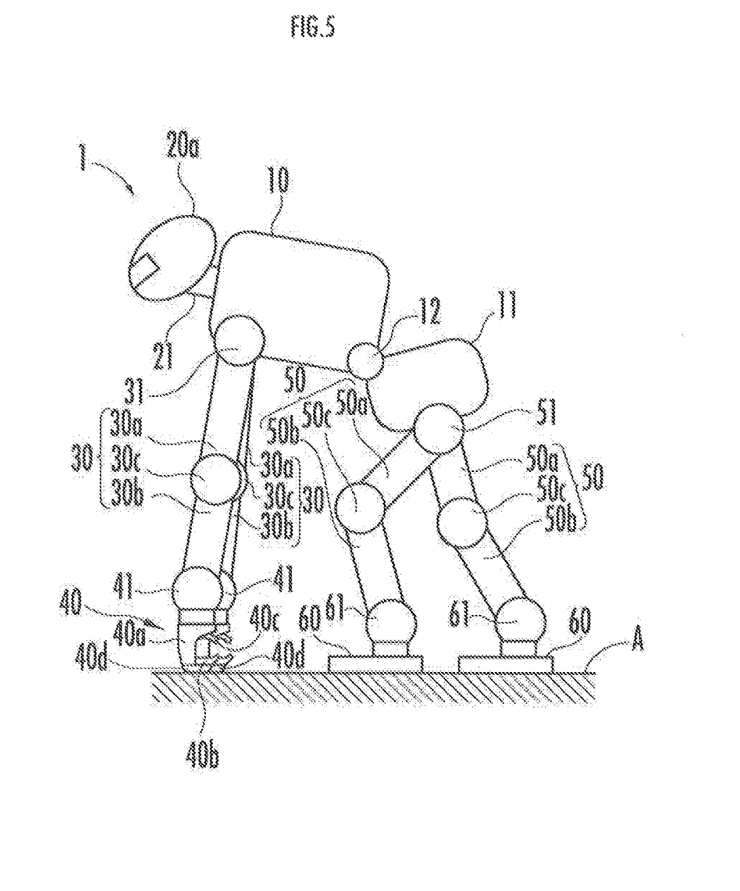
FIG. 5 is a side view that shows a state where moving in a quadrupedal walking mode of the robot.

The hand section 40 comprises a hand base section 40a corresponding to a person's palm of the hand and back of the hand, a first finger section 40b that is a single member corresponding to a person's forefinger, middle finger, ring finger, and little finger, a second finger section 40c corresponding to a person's thumb, and a cushioning member 40d attached to the first finger section 40b (refer to FIG. 5).

The first finger section 40b is integrally constituted with the hand base section 40a, and is fixed to the hand base section 40a. The second finger section 40c is attached to the hand base section 40a, so as to oppose a surface on the end part of the first finger section 40b of the hand base section 40a side. The second finger section 40c rotates so that the end part of the second finger section 40c approaches to or separates from the first finger section 40b, by a drive mechanism provided inside the hand base section 40a.

Since the second finger section 40c is constituted in such a way, the hand section 40 can easily perform an operation to pick up an object or the like by the first finger section 40b and the second finger section 40c, even if the first finger section 40b is fixed.

The left and right legs of the robot 1 are a left-right pair of leg links 50 extendingly provided downward from below the lower base body 11.

Each of the leg links 50 is rotatably connected with respect to the lower base body 11, via a hip joint mechanism 51 corresponding to a person's hip joint.

The leg link 50 is constituted by a first leg link section 50a corresponding to a person's thigh, a second leg link section 50b corresponding to a person's lower leg, and a knee joint mechanism 50c corresponding to a person's knee joint.

The first leg link section 50a is rotatably connected with respect to the lower base body 11, via the hip joint mechanism 51. The second leg link section 50b is rotatably connected with respect to the first leg link section 50a, via the knee joint mechanism 50c. A foot section 60 corresponding to a person's foot is connected to the end of the second leg link section 50b.

Note that, in the robot 1, the leg link 50, which is a leg, is constituted by the first leg link section 50a, the second leg link section 50b, and the knee joint mechanism 50c. However, the leg of the robot of the present invention is not limited to such a configuration, and may have a single link section, or may have three or more link sections and a plurality of joint mechanisms for connecting each of the links.

The foot section 60 is rotatably connected with respect to the second leg link section 50b of the leg link 50, via an ankle joint mechanism 61 corresponding to a person's ankle joint. In the robot 1, a manipulator is constituted by the leg link 50 and the foot section 60.

Next, the degrees of freedom of the joint mechanisms of the robot 1 will be described with reference to FIG. 2.

Note that, in the present embodiment, the directions in which each of the joint mechanisms cause each of the members to rotate are not limited unless otherwise stated, and are described on the basis of a posture where the members connected to each of the joint mechanisms are not rotating (hereinafter, called a "standard posture"). In the case of the robot 1, the standard posture will be when the robot 1 is in an upright state (a state where the upper base body 10, the lower base body 11, each of the arm links 30, and each of the leg links 50 extend in an approximately vertical direction).

Figure 2:
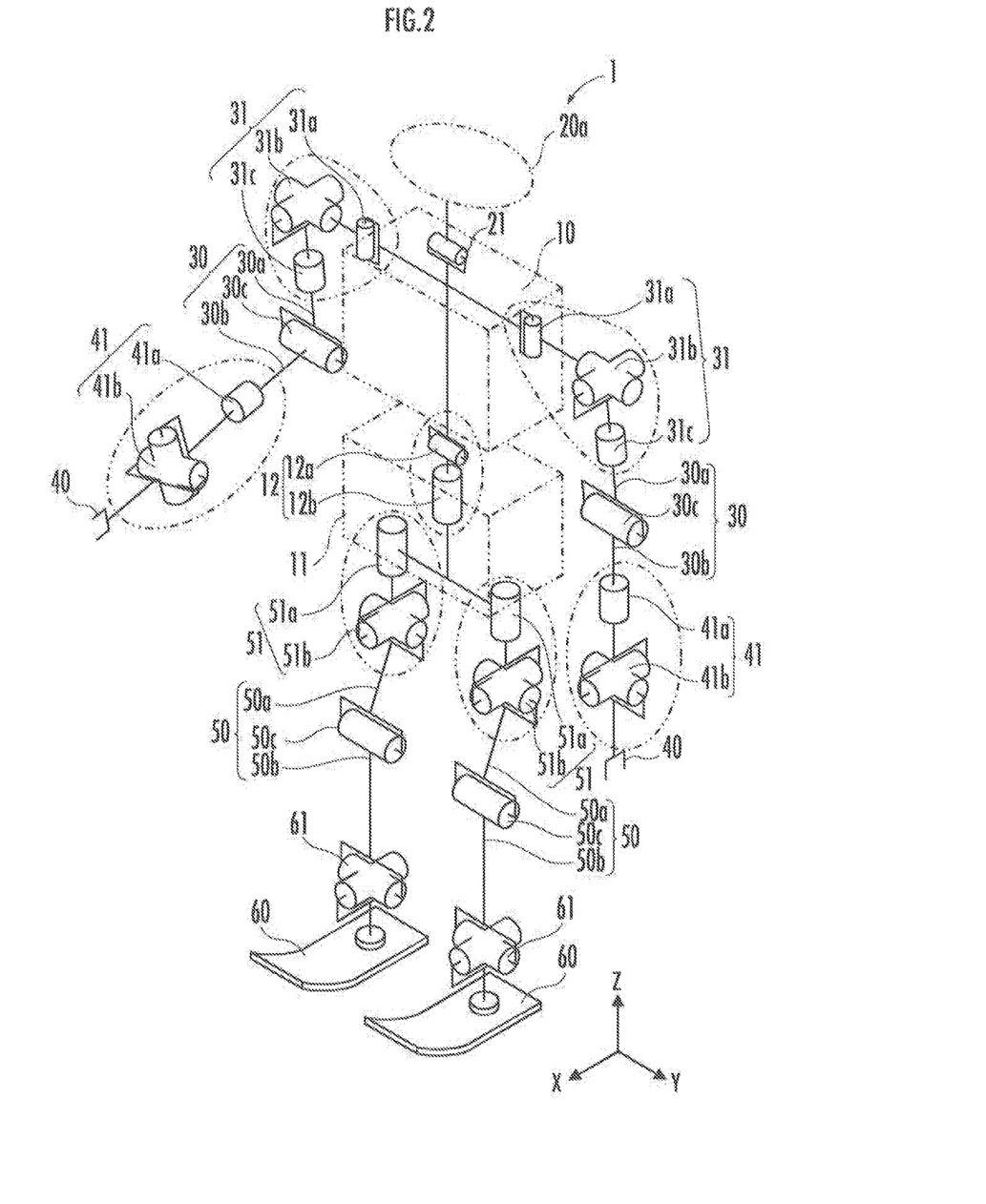
FIG. 2 is a perspective view that schematically shows the degrees of freedom of joint mechanisms of the robot.

Moreover, in the present embodiment, a yaw axis, a pitch axis, and a roll axis respectively mean an axis in the vertical direction (Z-axis), an axis in the left-right direction (Y-axis), and an axis in the front-rear direction (X-axis) of the robot 1 at the time when the robot 1 is in the standard posture, such as shown in FIG. 2. In this case, the yaw axis is a trunk axis of the upper base body 10 and the lower base body 11.

The waist joint mechanism 12 is constituted by a first waist joint mechanism 12*a* arranged below the upper base body 10, and a second waist joint mechanism 12*b* arranged between the first waist joint mechanism 12*a* and the lower base body 11.

The first waist joint mechanism 12*a* rotatably connects the upper base body 10 around the pitch axis with respect to the lower base body 11 and the second waist joint mechanism 12*b*. The second waist joint mechanism 12*b* rotatably connects the upper base body 10 and the first waist joint mechanism 12*a* around the yaw axis with respect to the lower base body 11.

The neck joint mechanism 21 rotatably connects the environment recognition unit 20*a* around the pitch axis with respect to the upper base body 10.

The elbow joint mechanism 30*c* of the arm link 30 rotatably connects the second arm link section 30*b* corresponding to a person's forearm around the pitch axis with respect to the first arm link section 30*a* corresponding to a person's upper arm.

The shoulder joint mechanism 31 is constituted by a first shoulder joint mechanism 31*a* arranged so as to be positioned within a range of a width in a vertical direction and a width in a horizontal direction of the upper base body 10, a second shoulder joint mechanism 31*b* arranged on an outer side of the upper base body 10, which is the side of the first shoulder joint mechanism 31*a*, and a third shoulder joint mechanism 31*c* arranged between the second shoulder joint mechanism 31*b* and the first arm link section 30*a* of the arm link 30.

The first shoulder joint mechanism 31*a* rotatably connects the second shoulder joint mechanism 31*b* around the yaw axis with respect to the upper base body 10. The second shoulder joint mechanism 31*b* rotatably connects the third shoulder joint mechanism 31*c* around the pitch axis and around the roll axis with respect to the first shoulder joint mechanism 31*a*. The third shoulder joint mechanism 31*c* rotatably connects the arm link 30 around the yaw axis with respect to the second shoulder joint mechanism 31*b*.

The wrist joint mechanism 41 is constituted by a first wrist joint mechanism 41*a* arranged on the hand section 40 side of the second arm link section 30*b* of the arm link 30, and a second wrist joint mechanism 41*b* arranged between the first wrist joint mechanism 41*a* and the hand section 40.

The first wrist joint mechanism 41*a* rotatably connects the second wrist joint mechanism 41*b* around the yaw axis with respect to the second arm link section 30*b*. The second wrist joint mechanism 41*b* rotatably connects the hand section 40 around the roll axis and around the pitch axis with respect to the first wrist joint mechanism 41*a*.

The knee joint mechanism 50*c* of the leg link 50 rotatably connects the second leg link section 50*b* corresponding to a person's lower leg around the pitch axis with respect to the first leg link section 50*a* corresponding to a person's thigh.

The hip joint mechanism 51 is constituted by a first hip joint mechanism 51*a* arranged below the lower base body 11, and a second hip joint mechanism 51*b* arranged on the leg link 50 side of the first hip joint mechanism 51*a*.

The first hip joint mechanism 51*a* rotatably connects the second hip joint mechanism 51*b* around the yaw axis with respect to the lower base body 11. The second hip joint mechanism 51*b* rotatably connects the leg link 50 around the pitch axis and around the roll axis with respect to the first hip joint mechanism 51*a*.

The ankle joint mechanism 61 rotatably connects the foot section 60 around the pitch axis and around the roll axis with respect to the second leg link section 50*b*.

Figure 3:
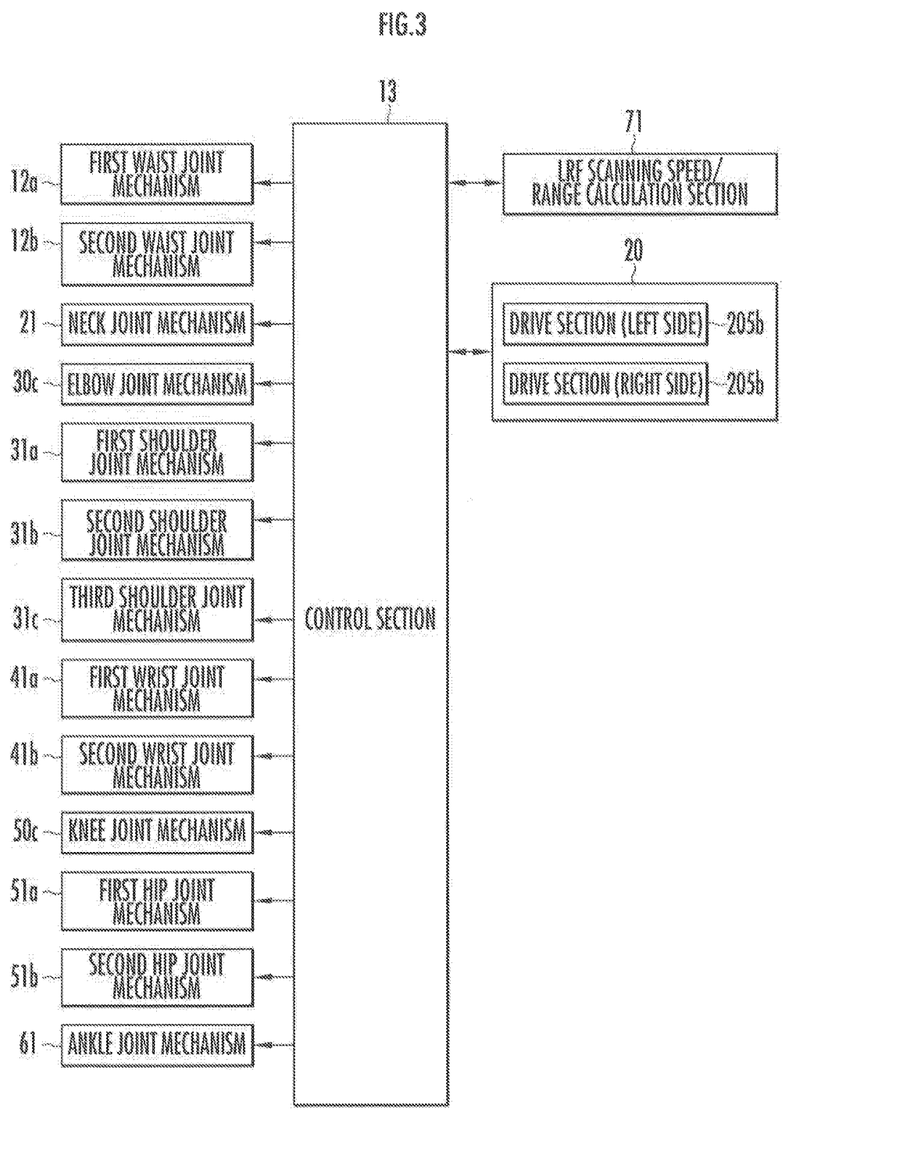
FIG. 3 is a block diagram that shows an electrical configuration of the robot.

As shown in FIG. 3, the first waist joint mechanism 12*a*, the second waist joint mechanism 12*b*, the neck joint mechanism 21, the elbow joint mechanism 30*c*, the first shoulder joint mechanism 31*a*, the second shoulder joint mechanism 31*b*, the third shoulder joint mechanism 31*c*, the first wrist joint mechanism 41*a*, the second wrist joint mechanism 41*b*, the knee joint mechanism 50*c*, the first hip joint mechanism 51*a*, the second hip joint mechanism 51*b*, and the ankle joint mechanism 61 are connected to the control section 13, and driving is controlled by the control section 13.

Note that, the configurations of the waist joint mechanism, the neck joint mechanism, the shoulder joint mechanism, the elbow joint mechanism, the knee joint mechanism, the hip joint mechanism, and the ankle joint mechanism in the robot of the present invention are not limited to the above described configurations, and may be arbitrarily changed, depending on the usage of the robot, the arrangement space of joints in the robot or the like. For example, any of the joint mechanisms may be omitted, or joint mechanisms other than those described above may be added.

Next, the two walking modes of the robot 1 will be described with reference to FIG. 4 and FIG. 5. Note that, in order to facilitate understanding, an illustration of the arm links 30 is omitted in FIG. 4.

Note that, in the present embodiment, "grounding" the hand sections 40 or the foot sections 60 means that the hand sections 40 or the foot sections 60 come into contact with the outside environment, so as to receive a contact reaction force where the hand sections 40 or the foot sections 60 resist a force acting on the robot 1.

Figure 4:
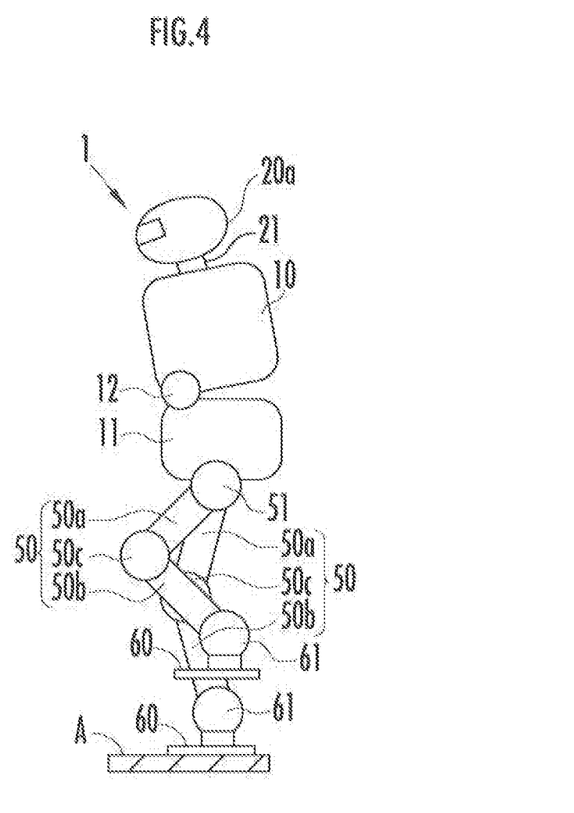
FIG. 4 is a side view that shows a state where moving in a bipedal walking mode of the robot.

As shown in FIG. 4, a bipedal walking mode repeats the process of having the foot section 60 on the end of one of the pair of leg links 50 in a state where grounded on a ground surface A (a state where this one of the leg links 50 is a supporting leg), and the foot section 60 on the end of the other leg link 50 moving in the air and then being grounded (this other leg link 50 moves as a free leg). In this case, the operation of each of the leg links 50 as a free leg is alternatively performed. Moreover, the arm links 30 omitted in the figure are in a non-grounded state.

As shown in FIG. 5, a quadrupedal walking mode repeats the process of having two or three of the hand sections 40 on the ends of the arm links 30 and the foot sections 60 on the ends of the leg links 50 in a state where grounded on the ground surface A (a state where these two or three of the arm links 30 and the leg links 50 are supporting legs), and the remaining two or one of the hand sections 40 or the foot sections 60 moving in the air and then being grounded (these remaining two or one of the arm links 30 or the leg links 50 move as free legs). In this case, the arm links 30 or the leg links 50 operating as free legs are periodically switched by a prescribed rule.

However, the operation of the quadrupedal walking mode is not limited to the above described operation. For example, it is possible to repeat the process of having one of the hand sections 40 on the ends of the arm links 30 and the foot sections 60 on the ends of the leg links 50 in a state where grounded to the ground surface A (a state where this one of the hand sections 40 or the foot sections 60 is a supporting leg), and the remaining three of the hand sections 40 and the foot sections 60 moving in the air and then being grounded (these remaining three of the hand sections 40 or the foot sections 60 move as free legs).

Moreover, it is possible to repeat the process of having the hand sections 40 on the ends of the arm links 30 and the foot sections 60 on the ends of the leg links 50 moving in the air all at the same time (namely, by having the robot 1 jump), and then being grounded.

Next, a structure for recognizing the outside environment of the environment recognition device 20 will be described with reference to FIG. 6 to FIG. 9.

Figure 6A:
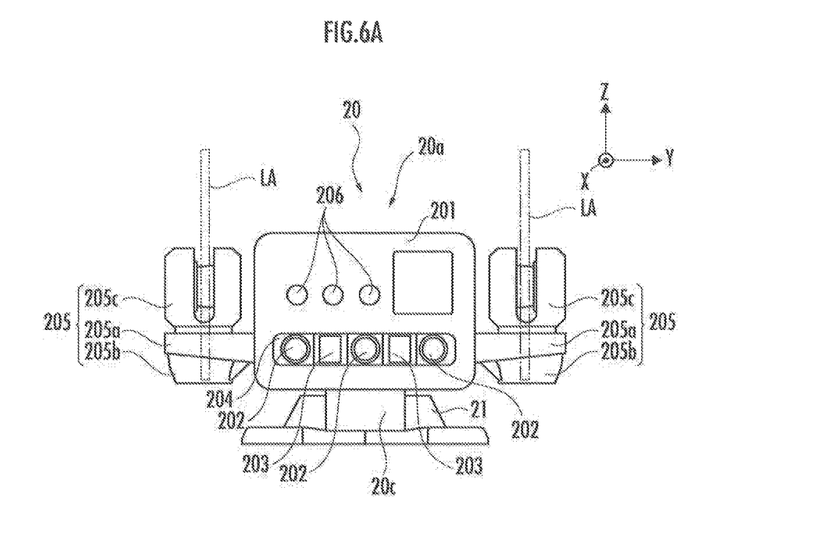
FIG. 6A is a front view that shows an environment recognition unit and a neck joint mechanism in a state where LRFs are not rotating.
Figure 6B:
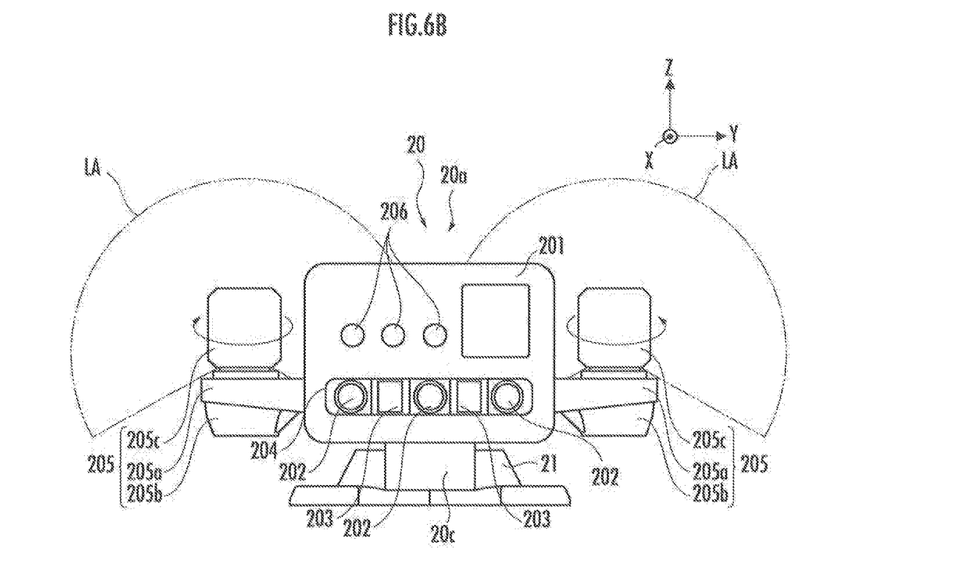
FIG. 6B is a front view that shows the environment recognition unit and the neck joint mechanism in a state where the LRFs are rotating.

As shown in FIG. 6, the environment recognition device 20 has an environment recognition unit 20a, an environment recognition unit control circuit 20b (not illustrated in FIG. 6. Refer to FIG. 1) arranged inside the upper base body 10, and a neck frame 20c extendingly provided facing downward (namely, to the upper base body 10) from the lower surface of the environment recognition unit 20a. By having the neck frame 20c rotatably supported by the neck joint mechanism 21, it becomes possible for the environment recognition unit 20a to rotate around the pitch axis (Y-axis) with respect to the upper base body 10.

The environment recognition unit 20a comprises an approximately rectangular head frame 201 (frame), three cameras 202 arranged so as to be disposed in a row on the front side inside the head frame 201, two lights 203 (light sources) arranged between the cameras 202 and constituted by LEDs or the like, a protective glass 204 for protecting the cameras 202 and the lights 203 and fitted into the head frame 201 on the front side of the cameras 202 and the lights 203, a left-right pair of LRFs 205 arranged on the sides outside the head frame 201, and light projectors 206 arranged on the upper side of the cameras 202 and the lights 203.

Figure 7A:
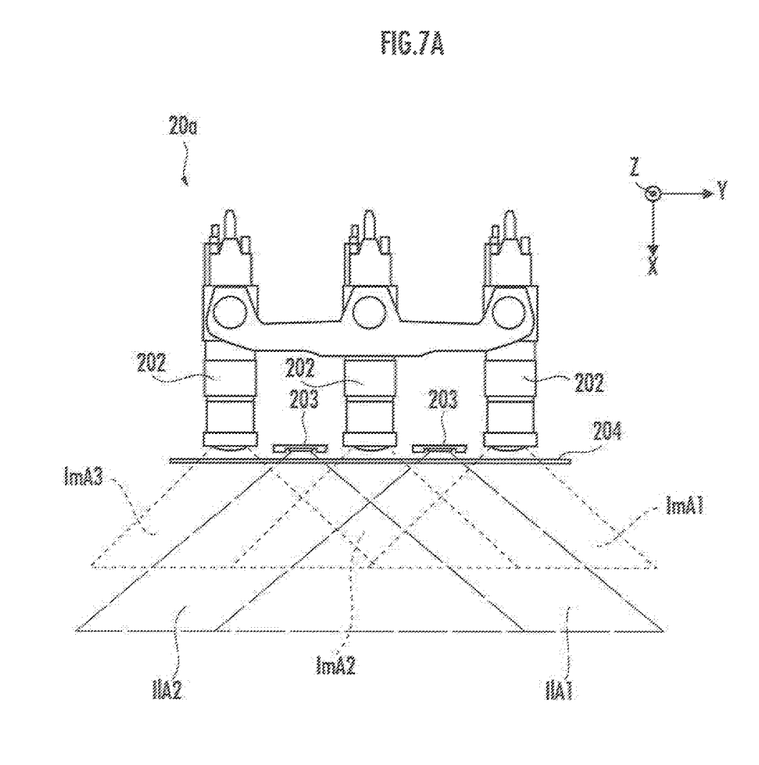
FIG. 7A is a plan view that shows imaging ranges of cameras and irradiation ranges of lights.

As shown in the plan view of FIG. 7A, in the environment recognition unit 20a, the outside environment in front of the environment recognition unit 20a is captured as a certain image with depth, by using two of the three cameras 202. Specifically, the cameras 202, from among the three cameras 202, view stereoscopically in a region where an imaging range ImA1 of the camera 202 on the right end of the paper surface and an imaging range ImA2 of the camera 202 in the center overlap, and a region where the imaging range ImA2 of the camera 202 in the center and an imaging range ImA3 of the camera 202 on the left end on the paper surface overlap.

Figure 7B:
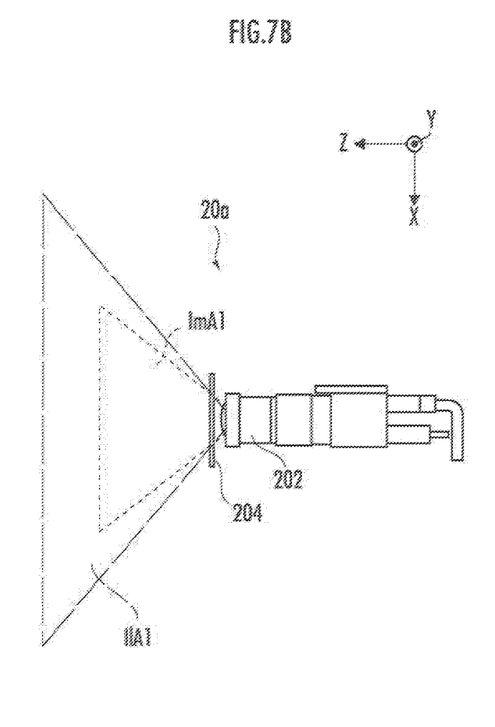
FIG. 7B is a side view that shows imaging ranges of cameras and irradiation ranges of lights.

As can be understood from the plan view of FIG. 7A and the side view of FIG. 7B, the lights 203 irradiate light so as to cover the regions where the cameras 202 view stereoscopically (the region where the imaging range ImA1 and the imaging range ImA2 overlap and the region where the imaging range ImA2 and the imaging range ImA3 overlap), in a horizontal direction and a vertical direction.

Note that, the above described imaging ranges ImA1 and ImA2 and illuminating ranges IlA1 and IlA2 are examples for showing the direction that light is irradiated, and the distances in the ranges capable of being captured by the cameras 202 and the ranges capable of being illuminated by the lights 203 can be larger than those in the imaging ranges ImA1 and ImA2 and the illuminating ranges IlA1 and IlA2, depending on the performance of the cameras 202 and the lights 203.

Moreover, as shown in FIG. 6, the environment recognition unit 20a comprises the light projectors 206 at a position that is above the cameras 202 and the lights 203, which is on the front side of the head frame 201. The light projectors 206 project a prescribed pattern (for example, a lattice pattern) to the outside environment in front of the head frame 201. The environment recognition device 20 captures this projected pattern by the cameras 202, and performs three-dimensional shaped recognition of the outside environment. Since the light projectors 206 are arranged above the cameras 202, a pattern can be projected farther than in the case where arranged on a same row with or below the cameras 202.

Note that, the above described cameras 202, lights 203, and light projectors 206 are examples, and the cameras in the present invention are not limited to such devices, and may be any devices that can recognize the outside environment in front of the robot 1. For example, infrared sensors or the like may be used.

Moreover, in the present embodiment, the lights 203, which are light sources, have an irradiation section for actually irradiating light, and a light emission section and control circuit necessary for heat exhaustion, constituted as one body, and are arranged on the front side inside the head frame 201, so as to be adjacent to the front side of a cooling mechanism, which will be described below.

However, in the case where using light sources with different structures (for example, light sources or the like connecting the light emission section and control circuit to the irradiation section by using optical fibers or prisms), only the light emission section or the control circuit necessary for heat exhaustion may be arranged so as to be adjacent to the cooling mechanism. In this case, the light emission section or the control circuit may be arranged on the rear side or on the sides of the cooling mechanism.

Moreover, in the environment recognition unit 20a, the outside environment on each side of the environment recognition unit 20a is recognized by each of the LRFs 205. Here, an LRF (Laser Range Viewfinder) is a device that measures the time until irradiated laser light returns after being reflected by the outside environment, and measures the distance to the outside environment, based on this time.

Note that, in the following description, an example of the range that laser light is irradiated is shown as a laser light irradiation range LA. However, this range is an example for showing the direction that laser light is irradiated, and the distance in the range capable of being measured by each of the LRFs 205 can be larger than that of the laser light irradiation range LA, depending on the intensity of laser light or the like.

The LRF 205 has a support section 205a extending to the side from the head frame 201, a drive section 205b (scanning unit) attached below the end part of the support section 205a, and a measurement section 205c (distance detection section) rotatably attached above the end part of the support section 205a. In the present embodiment, the robot 1 is an autonomous mobile system.

Figure 8A:
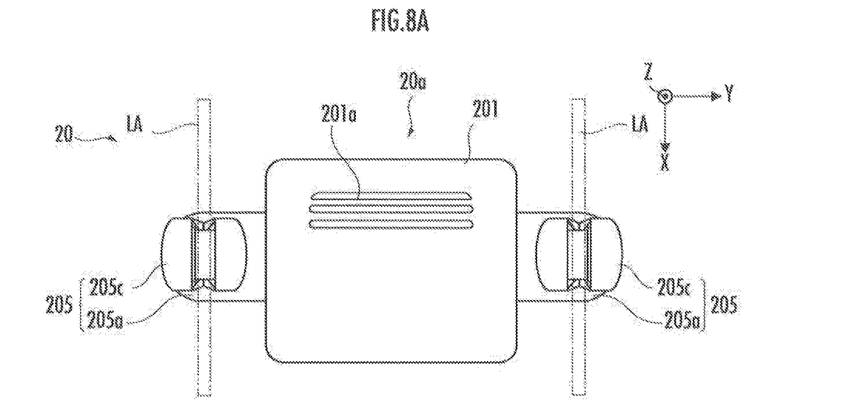
FIG. 8A is a plan view that shows the environment recognition unit and the neck joint mechanism in a state where measurement sections of the LRFs are not rotating.
Figure 8B:
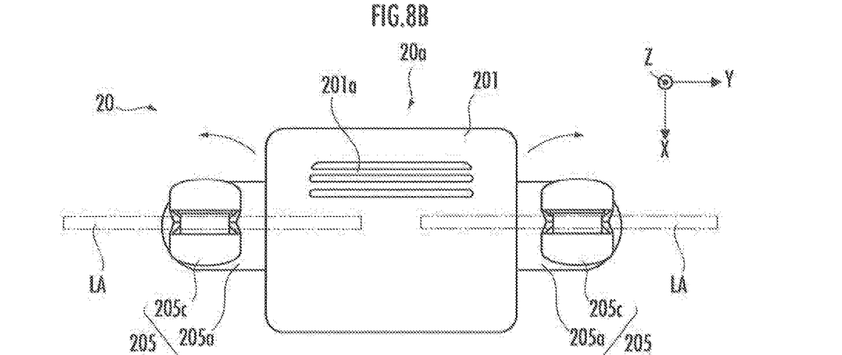
FIG. 8B is a plan view that shows the environment recognition unit and the neck joint mechanism in a state where the measurement sections of the LRFs are rotating to the back.
Figure 8C:
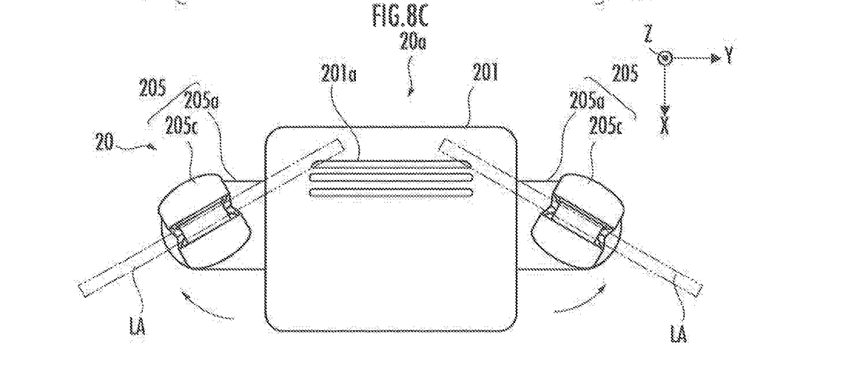
FIG. 8C is a plan view that shows the environment recognition unit and the neck joint mechanism in a state where the measurement sections of the LRFs are rotating to the front.

The drive section 205b is constituted by a drive source such as an actuator, a reduction gear or the like, and causes the measurement section 205c to rotate around the yaw axis (Z-axis), by this driving force (refer to FIG. 6B and FIG. 8).

The measurement section 205c irradiates laser light, and receives reflected laser light.

As shown in FIG. 8A, in the case where in a state where each of the measurement sections 205c of the LRFs 205 are not rotating, the laser light irradiation range LA of each of the LRFs 205 will be in a direction (X-axis direction) parallel to the front-rear direction of the head frame 201, in a vertical direction of the environment recognition unit 20a.

Moreover, as shown in FIG. 8B, each of the LRFs 205 can cause the measurement section 205c to rotate towards the rear (rotate the measurement section 205c on the left side of the paper surface anticlockwise, and rotate the measurement section 205c on the right side of the paper surface clockwise). Inversely, as shown in FIG. 8C each of the LRFs 205 can cause the measurement section 205c to rotate towards the front (rotate the measurement section 205c on the left side of the paper surface clockwise, and rotate the measurement section 205c on the right side of the paper surface anticlockwise).

Note that, the rotation of each of the measurement sections 205c in the above description and the angle of rotation of each of the measurement sections 205c shown as FIG. 8 are examples that show a state during rotation, and the left-right measurement sections 205c are constituted to be rotatable up to an angle sufficient for recognizing the surrounding environment. Moreover, only one of the left-right measurement sections 205c may be capable of rotating independently.

Figure 9A:
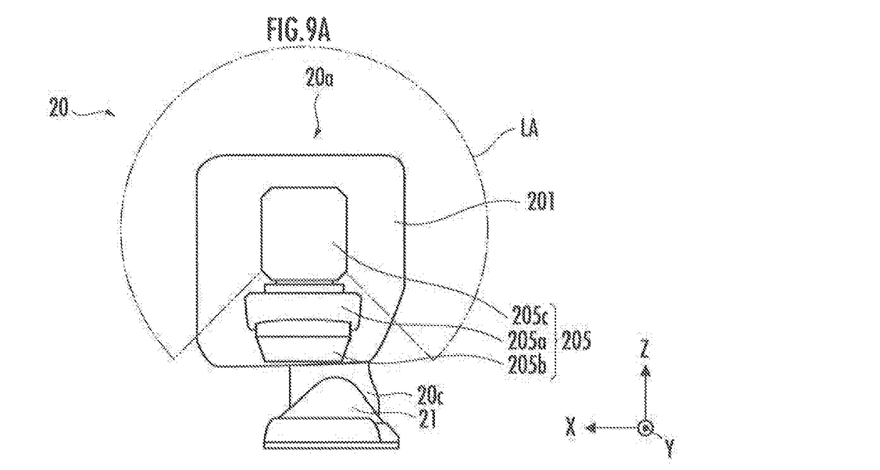
FIG. 9A is a side view that shows the environment recognition unit and the neck joint mechanism in a state where the environment recognition unit is in a standard posture.
Figure 9B:
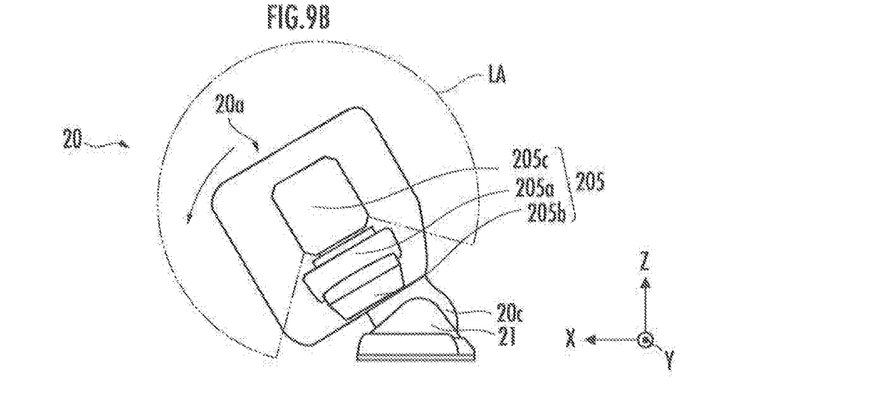
FIG. 9B is a side view that shows the environment recognition unit and the neck joint mechanism in a state where the environment recognition unit is inclined forward.
Figure 9C:
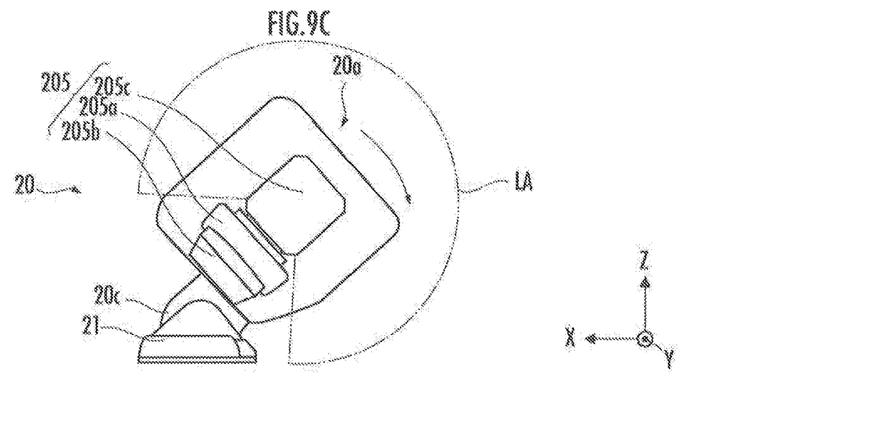
FIG. 9C is a side view that shows the environment recognition unit and the neck joint mechanism in a state where the environment recognition unit is inclined backward.

Incidentally, as shown in FIG. 9, the environment recognition unit 20a is rotatably connected around the pitch axis (Y-axis) with respect to the upper base body 10, by the neck joint mechanism 21. Specifically, from the state of the standard posture such as shown in FIG. 9A, the environment recognition unit 20a can be set to a state where inclined forward such as shown in FIG. 9B (a state corresponding to a state where a person is looking at his or her feet), or the environment recognition unit 20a can be set to a state where inclined backward such as shown in FIG. 9C (a state corresponding to a person looking upwards).

Moreover, the range capable of being recognized by each of the LRF 205 (namely, the central angle of a fan shape shown as the laser light irradiation range LA) is approximately 270° around a Y-axis centered on the measurement section 205c.

Accordingly, in the environment recognition unit 20a, the outside environment of almost the entire periphery of the environment recognition unit 20a can be recognized by the LRFs 205, by rotating each of the LRFs 205 around the yaw axis (Z-axis) (refer to FIG. 8), and rotating the environment recognition unit 20a around the pitch axis (Y-axis) (refer to FIG. 9).

Since such LRFs 205 and cameras 202 that stereoscopically view the front are comprised in the robot 1 of the present embodiment, the environment of a work region and peripheral region can be fully recognized, without significantly moving the environment recognition unit, compared to a conventional robot having an environment recognition unit configured to perform recognition only in front. Namely, in the robot 1 of the present embodiment, the axis of rotation or drive mechanism of the environment recognition unit 20a can be made smaller compared to that of a conventional robot.

Control information that includes a scheduled travel path or the like is wirelessly input from an operator to the robot 1. An LRF scanning speed/range calculation section 71, which calculates a scanning speed and scanning range of each of the measurement sections 205c of the LRFs 205, based on the scheduled travel path in the input control information, is provided in the robot 1 (refer to FIG. 3).

[LRF Switch Control]

Figure 10:
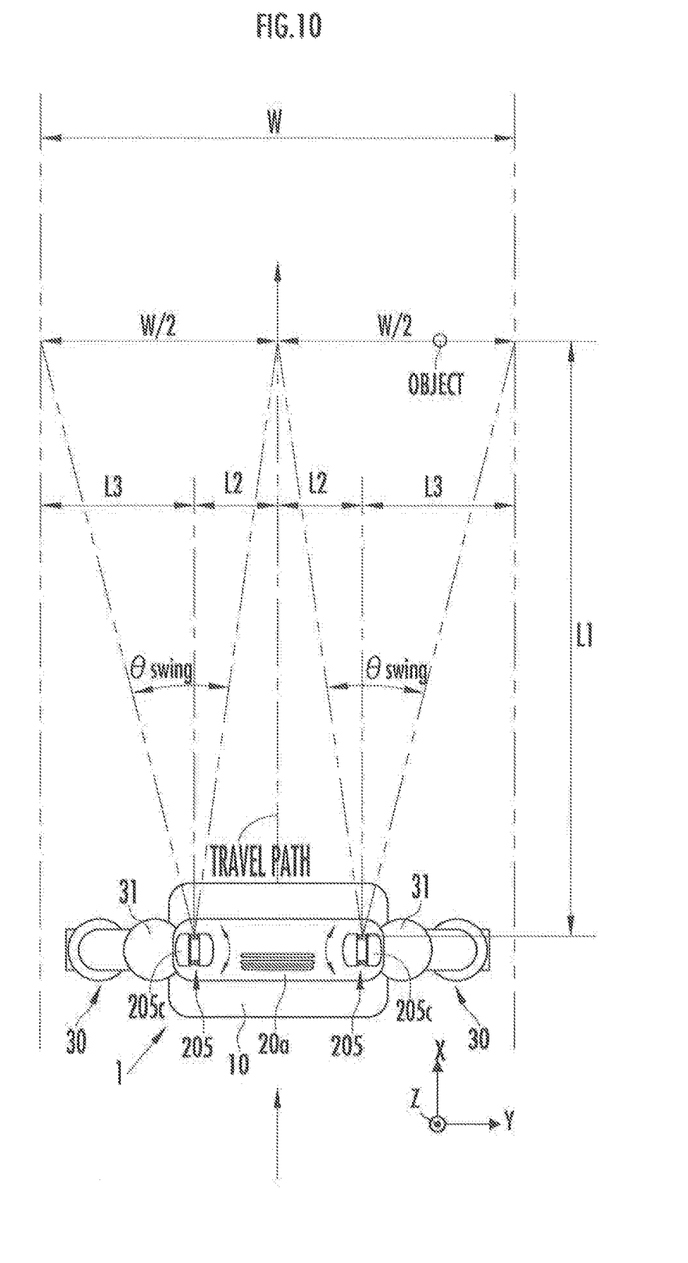
FIG. 10 is a plan view that schematically shows the robot and rotation ranges of the measurement sections of the LRFs.

As shown in FIG. 10, in the case where the robot 1 moves forward, the control section 13 causes each of the measurement sections 205c to rotate in a left-right direction around the yaw axis (Z-axis), by driving each of the drive sections 205b of the two LRFs 205. At the time when a passage width necessary for the robot 1 to pass through is W, the control section 13 causes each of the measurement sections 205c to rotate in a range of (W/2), by driving each of the drive sections 205b of the two LRFs 205.

In the present embodiment, for example, W is 0.8 m, and a travel speed Vrobot of the robot 1 is 2 km/h. In this case, at the time when the diameter of an object is D (m), the rotation speed of each of the measurement sections 205c is Vswing (deg/s), the threshold of a distance to the object at which the robot 1 can stop without coming into contact with the object is L1 (m), the distance to the center of each of the measurement sections 205c from the center of a travel path of the robot 1 is L2 (m), and (W/2)−L2 is L3 (m), the LRF scanning speed/range calculation section 71 calculates a rotation angle θswing when each of the measurement sections 205c rotates in a range of 0.4 m, which is (W/2), by the following (Equation 1).

$$\theta\text{swing} = \{90 - \tan^{-1}(L1/L2)\} + \{90 - \tan^{-1}(L1/L3)\} \quad \text{(Equation 1)}$$

Moreover, at the time when the rotation speed of each of the measurement sections 205c is Vswing (deg/s), and a sampling time of each of the measurement sections 205c when rotating around the yaw axis (Z-axis) is ΔT (s), the LRF scanning speed/range calculation section 71 calculates a rotation speed Vswing of each of the measurement sections 205c by the following (Equation 2).

$$V\text{swing} = \{(((D/\Delta T) - (V\text{robot} \times 2 \times \theta\text{swing}/180) \times \pi)/L1)/\pi\} \times 180 \text{ (deg/s)} \quad \text{(Equation 2)}$$

The control section 13 drives the drive sections 205b, so that each of the measurement sections 205c rotate at the rotation angle θswing and at the rotation speed Vswing calculated by the LRF scanning speed/range calculation section 71.

For example, in the case where D is 0.02 m, ΔT is 0.025 s, Vrobot is 0.555 m/s (2 km/h), L1 is 0.9 m, L2 is 0.141 m, and L3 is 0.259 m, $$\theta\text{swing} = \{90 - \tan^{-1}(0.9/0.141)\} + \{90 - \tan^{-1}(0.9/0.259)\} = 24.96°, \text{ and}$$

$$V\text{swing} = \{(((0.02/0.025) - (0.555 \times 2 \times 24.96/180) \times \pi)/0.9)\pi\} \times 180 = 20.15 \text{ (deg/s)}.$$

In the case where the travel speed Vrobot of the robot 1 is increased, the control section 13 performs a control to increase the rotation speed Vswing of each of the measurement sections 205c, or reduce the rotation angle θswing of each of the measurement sections 205c. By performing such a control, the robot 1 can be stopped without coming into contact with an object.

Note that, in the case where performing a control to increase the rotation speed Vswing of each of the measurement sections 205c, the diameter D of an object capable of being recognized will increase, and therefore it is preferable to perform a process for confirming with an operator.

Moreover, a limiter may be provided for the travel speed Vrobot of the robot 1. It is preferable for this limiter to be determined depending on the diameter D of an object to be recognized, and the limiter will decrease when the diameter D of the object to be recognized decreases.

Moreover, at the time when a space measurement resolution is θresolution (rad), a nearest distance that an object can be detected is Lmeas (m), and a time necessary to reciprocate the range of θswing by each of the measurement sections 205c (reciprocating scan) is Tscan (s), the LRF scanning speed/range calculation section 71 calculates θresolution by Vswing×ΔT, calculates Lmeas by D/θresolution, calculates Tscan by 2×θswing/Vswing, and calculates a distance Lmove that the robot 1 moves during the reciprocating scan by Vrobot×Tscan. In this case, the control section 13 performs a control so as to satisfy Lmeas−Lmove≥L1. By this control, the robot 1 can be stopped at a position separated L1 or more from an object, without coming into contact with the object.

In the present embodiment, Vswing (rad/s) is 0.3517, θresolution=Vswing×ΔT=0.3517×0.025=0.00879, Lmeas=D/θresolution=0.02/0.00879=2.275, Tscan=2×θswing/Vswing=2×24.96/20.15=2.477, Lmove=Vrobot×Tscan=0.555×2.477=1.375, and Lmeas−Lmove=2.275−1.375=0.9, and Lmeas−Lmove=0.9≥L1 (0.9) is satisfied.

In the case where Lmeas−Lmove≥L1 is not satisfied, a control is performed to reduce the travel speed Vrobot of the robot 1, or to reduce θswing.

The control section 13 performs a control so that the left-right direction center of the scheduled travel path of the robot 1 and the rotation range right end of the drive section 205b on the left side and the rotation range left end of the drive section 205b on the right side match each other.

Figure 11:
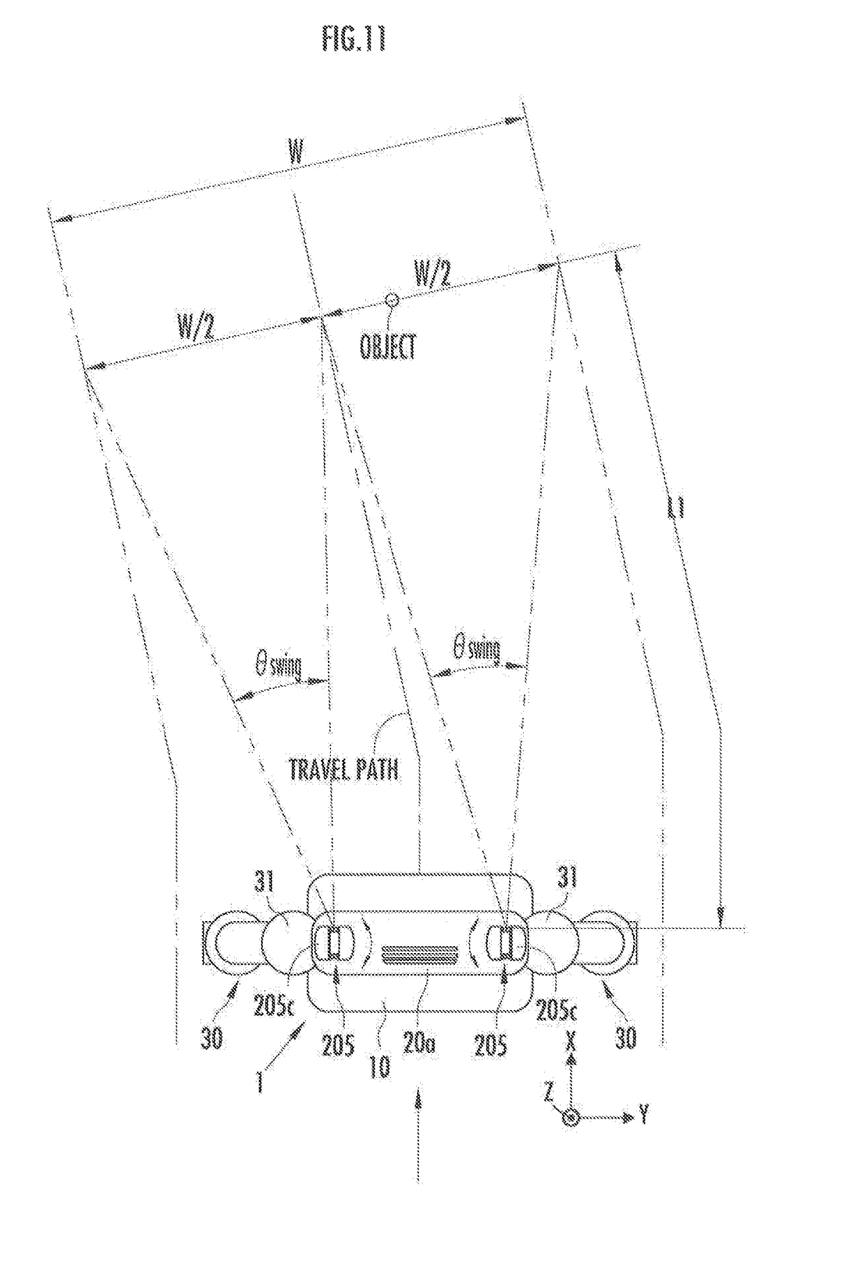
FIG. 11 is a plan view that schematically shows the robot, a scheduled travel path of the robot, and rotation ranges of the measurement sections of the LRFs.

As shown in FIG. 11, in the case where the scheduled travel path of the robot 1 is not straight and is curved, a control is performed so that the left-right direction center of the scheduled travel path of the robot 1 and the rotation range right end of the drive section 205b on the left side and the rotation range left end of the drive section 205b on the right side match each other. Namely, an object is searched for in directions different to the direction in which the robot 1 is presently facing. As a result, even in the case where the scheduled travel path of the robot 1 is curved, the robot 1 can be stopped, without coming into contact with an object that is on the scheduled travel path.

While the robot 1 is used as a mobile body in the above described embodiment, it is not limited to this. Moreover, while the robot 1 provided with a mobile body and a scanning control unit is used, a control device having a scanning control unit may be provided, separately from a mobile body.

What is claimed is:

1. An autonomous mobile system, comprising:
   a mobile body configured to move at a travel speed within a range of travel speeds;
   a distance detection section provided in the mobile body and configured to detect a distance to an object;
   a scanning unit provided in the mobile body and configured to perform scanning by causing the distance detection section to rotate around an axis in a vertical direction as a center of rotation; and
   a scanning control unit configured to:
   determine the travel speed of the mobile body within the range of travel speeds;
   control a scanning speed and a scanning range of the distance detection section by controlling driving of the scanning unit based in part on the travel speed of the mobile body; and
   determine an upper limit of the range of travel speeds based on the scanning speed of the distance detection section.

2. The autonomous mobile system according to claim 1, wherein, in a case where the set travel speed is increased, the control unit controls driving of the scanning unit so as to perform at least one of a control to reduce the scanning range of the distance detection section and a control to increase the scanning speed of the distance detection section.

3. The autonomous mobile system according to claim 1, wherein the control unit determines a center of the scanning range of the distance detection section based on a scheduled travel path of the mobile body.

* * * * *